United States Patent [19]
Zodrow

[11] 4,045,276
[45] Aug. 30, 1977

[54] APPARATUS FOR APPLYING FOIL LABELS TO CONTAINERS

[75] Inventor: Rudolf Zodrow, Dusseldorf, Germany

[73] Assignee: Jagenberg Werke Aktiengesellschaft, Dusseldorf, Germany

[21] Appl. No.: 723,833

[22] Filed: Sept. 16, 1976

[30] Foreign Application Priority Data

Oct. 7, 1975 Germany ............................ 2544785

[51] Int. Cl.[2] ............................................ B29C 17/00
[52] U.S. Cl. .................................... 156/571; 156/227
[58] Field of Search ................ 156/475, 571, 566-570, 156/521, 227, DIG. 14

[56] References Cited

U.S. PATENT DOCUMENTS 3,871,943 3/1975 Zodrow .......................... 156/571 X
3,970,499 7/1976 Bommes .............................. 156/227

*Primary Examiner*—David A. Simmons
*Attorney, Agent, or Firm*—Burgess, Dinklage & Sprung

[57] ABSTRACT

A known apparatus for applying diagonal labels to the necks of bottles, and comprising a rotating support carrying a rotating element for picking up a label from a supply, and first means for folding over the leading horizontally projecting point of the label so as to reenforce it and eliminate tearing during pickup by a gripper element which will ultimately pass it along to the bottle, is modified as follows: a second folding means is provided, partially concentrically arranged on the rotating support, to bend down and then fold a full 180° C the top label point so it will produce a neat wrap around the container. The first folding means can also be concentrically arranged on the rotating support.

7 Claims, 14 Drawing Figures

APPARATUS FOR APPLYING FOIL LABELS TO CONTAINERS

The present invention relates to an apparatus for applying labels to the necks of bottles.

It is known to envelop the necks of bottles, including the cork or closure therefor, with a rectangular foil blank by applying the foils to the bottles diagonally with points projecting horizontally and vertically. The downwardly projecting point will lie flat on the neck of the bottle, while the upper point is wrinkledly compressed on the top so that a bottle wrap will result which is not very nice looking. In order to make the upper closing smoother and thus neater, it has already been attempted partially to cut off the upwardly projecting portion of the label prior to the compression but this measure did not give satisfactory results.

It is also known, from U.S. patent application Ser. No. 469,716, filed May 15, 1974, now U.S. Pat. No. 3,970,499, to reinforce the forwardly projecting point of a rectangular foil blank, which is to be picked up by grippers, by carrying the blank past a folding station which folds over the forwardly projecting point.

It is an object of the invention to modify a known bottle labeling apparatus so as to permit neat wrapping of the neck, the apparatus comprising a rotating support carrying a rotating element for picking up a label from a supply, and first means for folding over the leading horizontally projecting point of the label so as to reinforce it and eliminate tearing during pickup by a gripper element.

This and other objects and advantages are realized in accordance with the present invention pursuant to which a second folding means is provided, partially concentrically arranged on the rotating support, to bend down and then fold a full 180° the top label point so it will produce a neat wrap around the container. The first folding means can also be concentrically arranged on the rotating support. If the blank is covered with glue, the pressing effects a gluing of the point.

The folding element is preferably arranged at the center of the support. The folding means can be shaped as a cylinder with a conical guiding surface for bending of the upwardly vertically projecting point in the direction of the pickup element. This simple construction element effects the preliminary bending. The structure for further bending is also simple, i.e. there can be provided a means including a bar running from above diagonally downwards in circumferential direction of the path of movement of the foil blank carried by the gripper element.

The invention will now be further described with reference to the accompanying drawings wherein.

Figure 1:
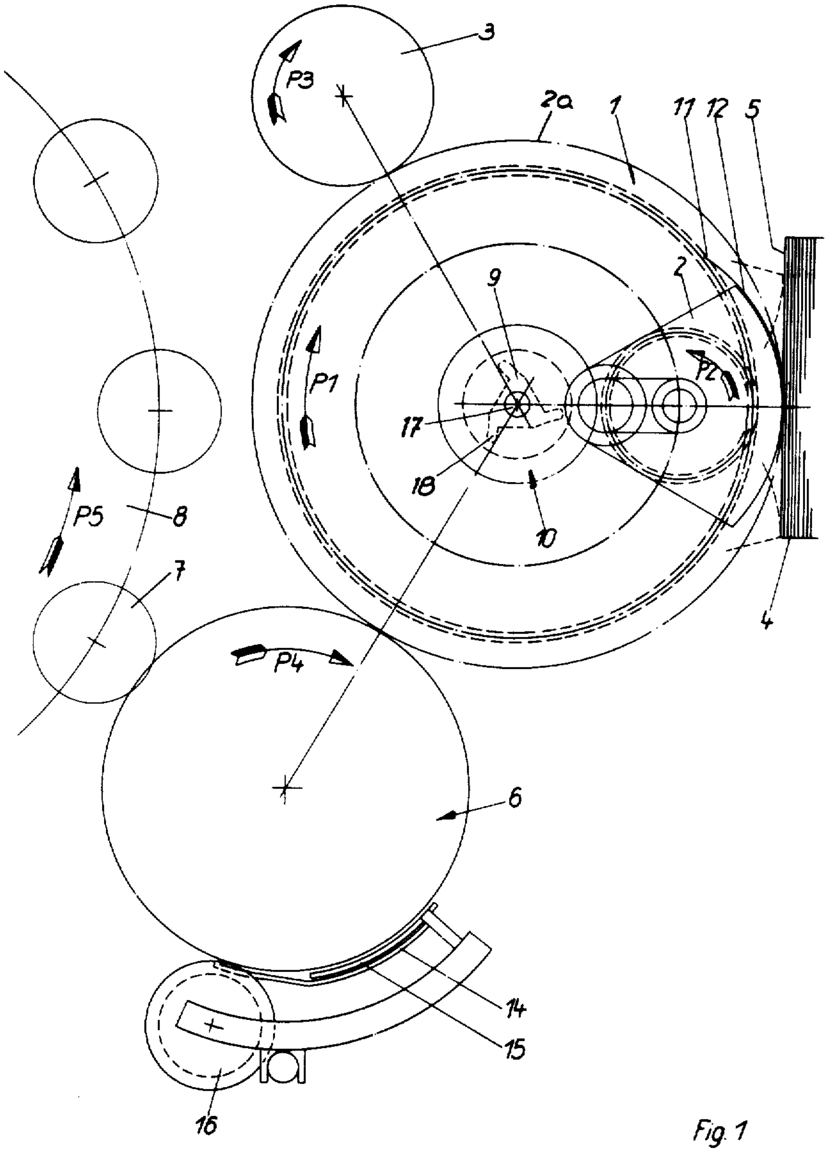
FIG. 1 is a diagrammatic top view of a portion of a labeling station with means for folding the points of foil blanks in accordance with the invention.

Referring now more particularly to the drawing, the labeling station shown in the drawing consists of a plate-shaped support revolving in the direction of the arrow $P_1$ having at least one pickup element 2 eccentrically supported thereon and rotating in the direction of the arrow $P_2$. A glue roller 3 is tangent to the outer path of rotation *2a* of the pickup element 2, revolving in the direction of the arrow $P_3$. A supply station 4 for foil label blanks of which the upper blank 5 is also tangent to the outer path of rotation *2a* of the pickup element 2. A gripper cylinder 6, rotating in the direction of the arrow $P_4$, is also tangent to the outer path of rotation *2a* of the pickup element 2, and a bottle plate 8 transports bottles 7 past the gripper cylinder 6 in the direction of the arrow $P_5$.

Figure 2:
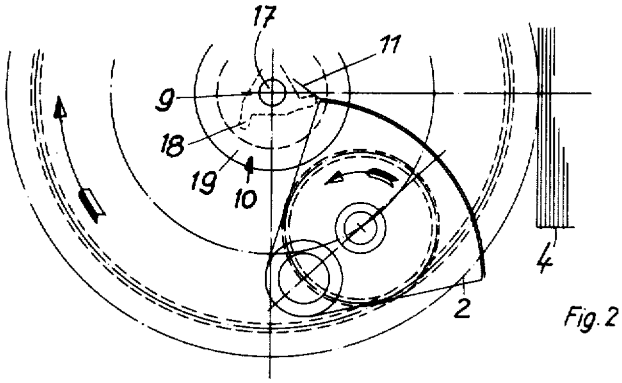
FIG. 2 is a part of the labeling station of FIG. 1 during the turning down of the forward horizontally projecting point of the foil blank.
Figure 3:
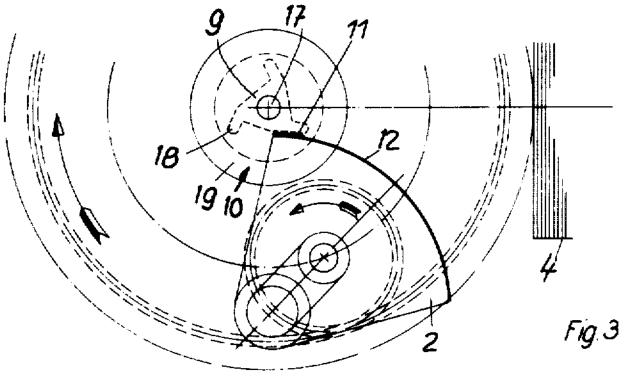
FIG. 3 shows the labeling station of FIG. 2 after completing folding of the forward part of the foil blank.
Figure 4:
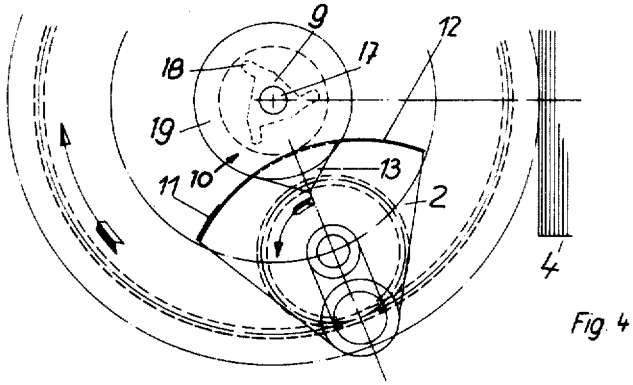
FIG. 4 shows part of the labeling station of FIG. 2 during bending down of the upper point of the foil blank.

In the center of the plate-shaped support 1 there is provided a shaft 17 which, at a height corresponding to the middle of the pickup element 2, carries a folding element 9 comprising three radially projecting fingers 18 for the front point 11 of the foil blank 12. Directly above the pickup element 2, the shaft 17 carries an additional folding means 10 for the upper point 13 of the foil blank 12 in the form of a cylindrical disk with a conically shaped or outwardly inclined surface 19. The folding means 9 has a special shape shown in the drawing which, as is evident from FIGS. 2 to 4, effects a complete folding of the front point 11 of the blank 12 held on the outwardly curved face of the pickup element 2. The cylindrical disk 10 extends over the convexly curved face of the pickup element 2 as is best seen in FIG. 4. Due to this overlapping, the upper point 13 of the blank 12 is bent or deflected in the direction of the pickup element 2, as is also seen in FIG. 4.

The gripper cylinder 6 has at least one gripper element with two gripper jaws *6a*. The gripper element receives the foil blank 12 from the pickup element 2 and delivers it to the bottles 7. In this way, the blank is moved past the device for the additional folding of the upper point 13. This device includes an upper bar 14 running diagonally downwardly and a holding bar or anvil 15 arranged thereunder, proceeding in the same plane. In addition, a pressing roller 16 arranged after the bar 14 is also provided. As will be described more fully hereinbelow, the upper point 13 first turned down comes into the range of the bar 14 which continues to fold the point, 15 serving as a back-up anvil. The point 13 turned down in this manner then comes into the range of the roller 16 which presses the tip onto the remaining portion of the blank held against plate 20 as an anvil to form a sharp crease.

Figure 5:
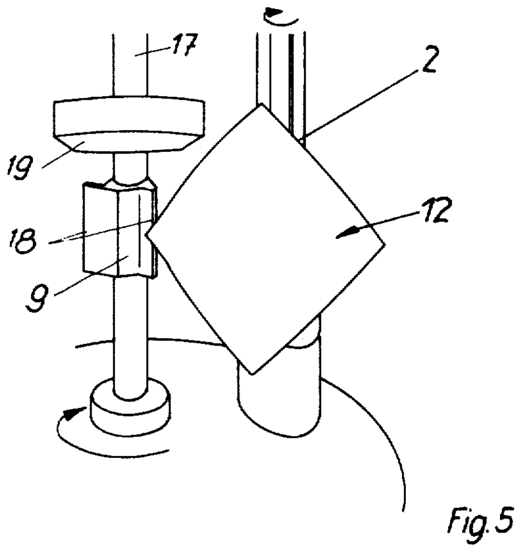
FIGS. 5 to 14 are perspective views of parts of the labeling station to FIG. 1 during the bending down and folding of the front and upper points of the foil blank.
Figure 6:
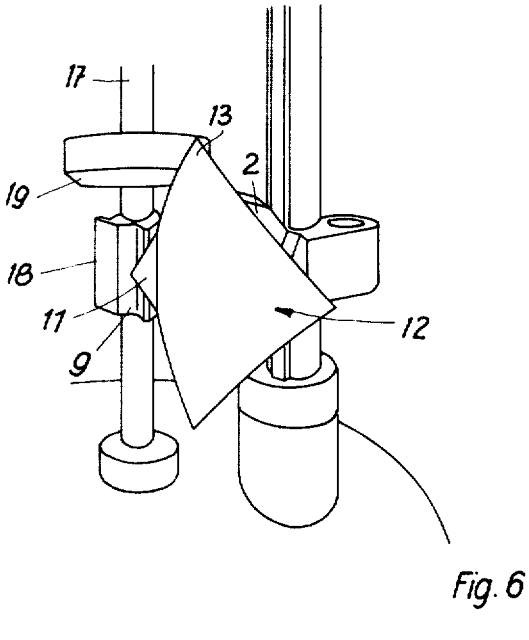
Figure 7:
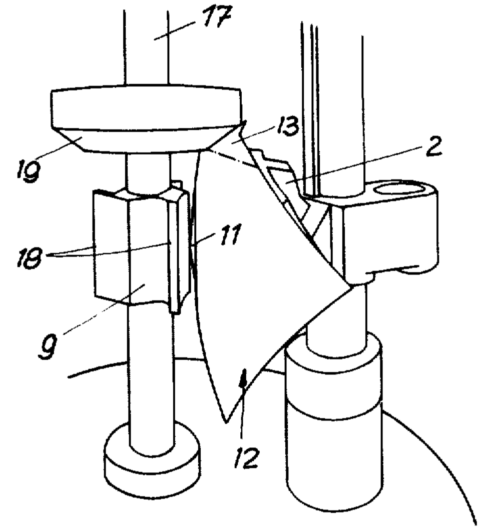

Reviewing the operation as shown in FIGS. 5 to 14, the pickup element 2 covered with glue at the plate by the roller 3, through adhesion takes along the topmosst foil 12 while rolling over the foil stack 4. In FIG. 5 the apparatus is shown directly after pickup of a foil blank 12 by the pickup element 2. FIG. 6 shows the start of the folding of the forward point 11 by the folding means 9. The folding takes place there in the direction of the side not covered with glue so that the front point 11 can again be folded back later on without difficulty. FIG. 7 shows the folding process of the front point 11 virtually completed and the upper point 13 is just beginning to bent backwards.

Figure 8:
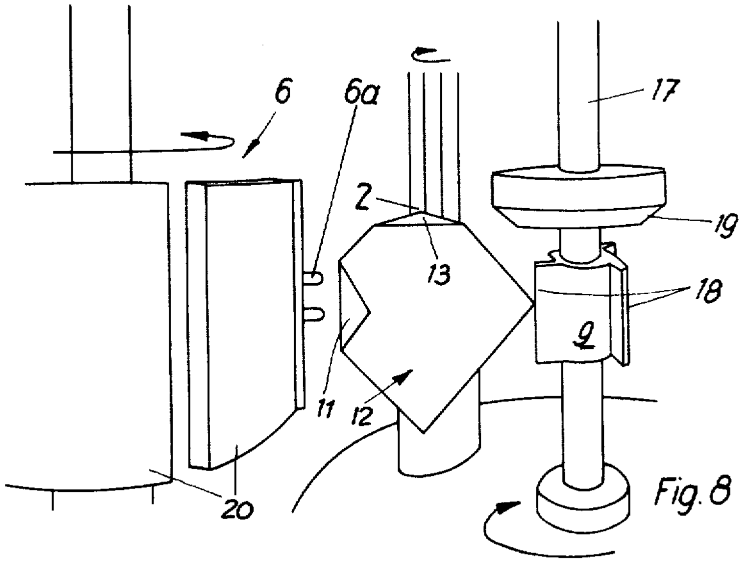
Figure 9:
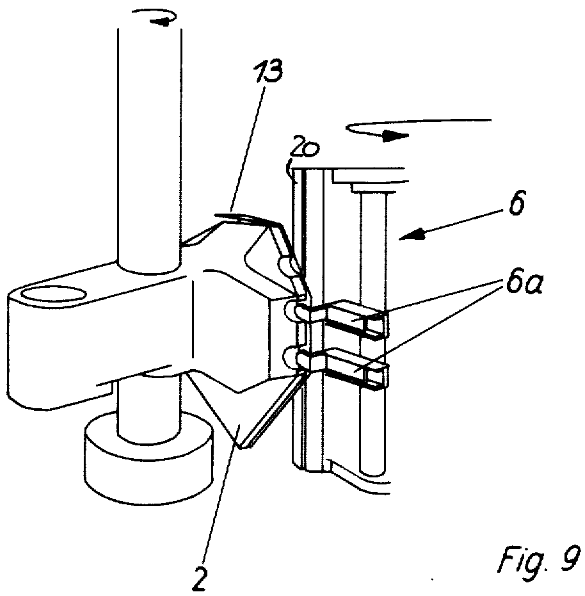

FIG. 8 shows the apparatus directly before delivery of the foil blank 12 from the pickup element 2 to the gripper cylinder 6 with its gripper jaws *6a*. FIG. 9 shows the delivery of the blank from the pickup element 2 (shown here from the back) to the gripper cylinder 6, the gripper jaws 6a having already gripped the blank at the edge reinforced through folding of the front tip 11.

Figure 10:
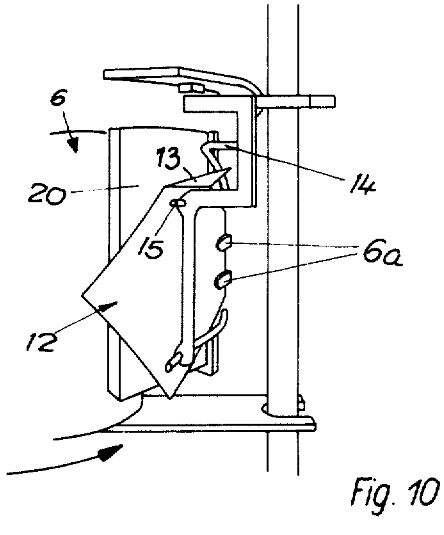
Figure 11:
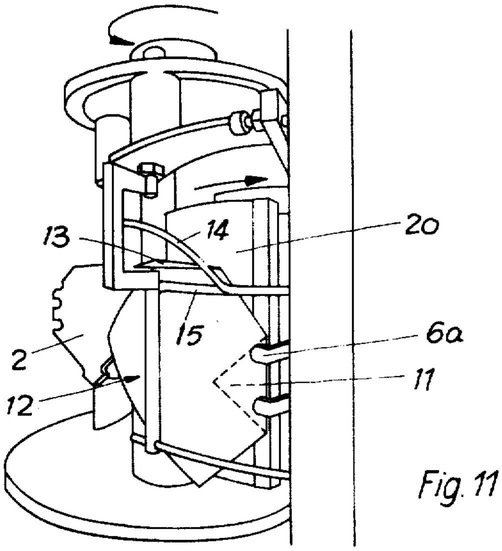
Figure 12:
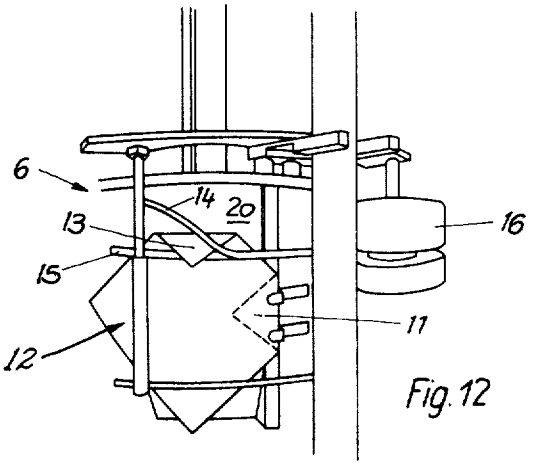
Figure 13:
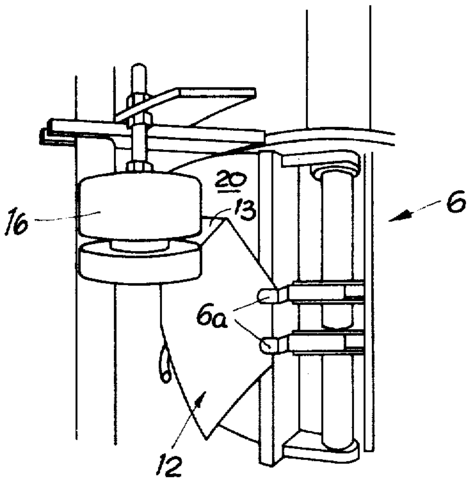
Figure 14:
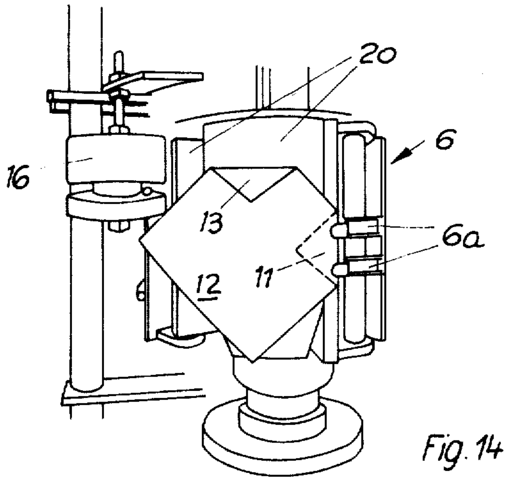

In FIG. 10, the blank 12 held by the gripper cylinder 6 is inserted into the means 14, 15 with its upper bent point 13. The upper bar 14 extending diagonally downward presses the point 13 downwards, the other horizontally running bar 15 serving as a counter support, i.e. an anvil. In FIGS. 11 and 12 the insertion of the point 13 between members 14, 15 is seen from another angle. The members 14, 15 fold the point 13 virtually up to 180° C compared to its original position before folding by means 10. After leaving 14, 15, the pressing roller 6 goes into action according to FIG. 13, which causes a sharp crease and presses the point 13 flat onto the blank 12, blank 12 being supported on the backside by curved plane 20. FIG. 14 shows the blank 12 after leaving the pressing roller 16.

The foil blank 12 thus prepared by folding is then applied in customary manner to the necks of the bottles 7 moved past the gripper cylinder 6, the blanks 12 sticking to the bottles 7 with the glued side. The blank 12 is then wrapped around the neck of the bottle with brushes or the like. Then the portion projecting above the bottle cover is pressed flat onto the bottle cover with conventional equipment.

It will be appreciated that the instant specification and examples are set forth by way of illustration and not limitation, and that various modifications and changes may be made without departing from the spirit and scope of the present invention.

What is claimed is:

1. In an apparatus for applying to a container labels having a plurality of points, comprising a rotating support, a rotating element on said support for picking up a foil label from a supply and for moving said label with a point thereof projecting horizontally and another point projecting vertically, first means for folding over said horizontally projecting point as said rotating pickup element carries said label past a folding station, and a rotating gripper element receiving said label from said pickup element and gripping it where folded over, the improvement which comprises a second means for folding over said vertically projecting point after said pickup element picks up said label from said supply, whereby a more neat wrap will be produced when said label is applied to a container to be wrapped thereabout.

2. An apparatus according to claim 1, wherein said first folding means is carried on said rotating support and rotates therewith, said first folding means including at least one finger which engages said horizontally projecting point and effects its fold over.

3. An apparatus according to claim 1, wherein said second folding means includes a cylinder having an inclined surface, said cylinder being carried on said rotating support, the vertically projecting point of said label contacting said inclined surface and being bent thereby.

4. An apparatus according to claim 3, wherein said second folding means includes deflecting means beyond said rotating support and engaged by the bent vertically projecting label point so as to complete the fold of said point.

5. An apparatus according to claim 4, wherein said deflecting means is positioned to act upon said bent vertically projecting label point after said label is received by said gripper element.

6. An apparatus according to claim 5, wherein said deflecting means includes an inclined folding bar and an anvil cooperating therewith serving to bend the point still further, and a roller, said gripper element including a label support surface, said roller working upon said bent point and against said support surface so as to complete a 180° bend.

7. An apparatus according to claim 6, wherein said first folding means is carried on said rotating support and rotates therewith, said first folding means including at least one finger which engages said horizontally projecting point and effects its fold over.

* * * * *